(12) United States Patent
Dupray et al.

(10) Patent No.: US 11,438,727 B2
(45) Date of Patent: Sep. 6, 2022

(54) NETWORK SERVICES DEPENDENT ON GEOGRAPHICAL CONSTRAINTS

(71) Applicant: Dennis J. Dupray, Golden, CO (US)

(72) Inventors: Dennis J. Dupray, Golden, CO (US); Sheldon F. Goldberg, Denver, CO (US)

(73) Assignee: Dennis Dupray, Golden, CO (US)

( * ) Notice: Subject to any disclaimer, the term of this patent is extended or adjusted under 35 U.S.C. 154(b) by 0 days.

(21) Appl. No.: 16/659,562

(22) Filed: Oct. 21, 2019

(65) Prior Publication Data
US 2020/0296541 A1 Sep. 17, 2020

Related U.S. Application Data

(63) Continuation of application No. 15/622,856, filed on Jun. 14, 2017, now Pat. No. 10,455,356, which is a
(Continued)

(51) Int. Cl.
*H04W 4/02* (2018.01)
*G06Q 30/02* (2012.01)
*G06Q 50/34* (2012.01)
*G07F 17/32* (2006.01)
*H04M 3/42* (2006.01)
(Continued)

(52) U.S. Cl.
CPC .......... *H04W 4/023* (2013.01); *G06Q 30/02* (2013.01); *G06Q 50/34* (2013.01); *G07F 17/3288* (2013.01); *H04L 67/51* (2022.05); *H04L 67/52* (2022.05); *H04M 3/4228* (2013.01); *H04M 3/42229* (2013.01); *H04M 3/4878* (2013.01); *H04M 3/493* (2013.01); *H04W 4/02* (2013.01); *H04M 3/42059* (2013.01);
(Continued)

(58) Field of Classification Search
CPC .... G06Q 30/02; G06Q 50/34; G07F 17/3288; H04M 2242/14; H04M 2242/15; H04M 2242/30; H04M 3/42059; H04M 3/42229; H04M 3/4228; H04M 3/4878; H04M 3/493; H04W 4/02; H04W 4/023; H04W 8/08
See application file for complete search history.

(56) References Cited

U.S. PATENT DOCUMENTS 8,694,025 B2 * 4/2014 Dupray ............... H04M 3/4228
455/456.3
9,078,101 B2 * 7/2015 Dupray ............... G07F 17/3288
(Continued)

*Primary Examiner* — Kashif Siddiqui
(74) *Attorney, Agent, or Firm* — Yiu F. Au; Au Law Office

(57) ABSTRACT

A method and system are disclosed for determining the geographic location of a user communicating on a communications network such as the Internet. In one embodiment, a provider of a product or service: (a) receives the user's phone number (or other identification for contacting the user's station), and (b) supplies the user's station with a distinctive identifier. The provider then supplies a location determining service with the user's phone number (or other identification). A phone call is made to the phone number by the location determining service for retrieving the distinctive identifier from the network station having the phone number. If the distinctive identifier is retrieved and the location determining service determines that the user's station is within an appropriate geographical area (or not within an inappropriate area), then the provider can provide the requested product or service to the user.

44 Claims, 3 Drawing Sheets

Related U.S. Application Data continuation of application No. 14/791,387, filed on Jul. 3, 2015, now Pat. No. 9,699,609, which is a continuation of application No. 14/228,951, filed on Mar. 28, 2014, now Pat. No. 9,078,101, which is a continuation of application No. 13/561,846, filed on Jul. 30, 2012, now Pat. No. 8,694,025, which is a continuation of application No. 10/857,565, filed on May 28, 2004, now abandoned.

(51) Int. Cl.

| | | |
|---|---|---|
| *H04M 3/487* | (2006.01) | |
| *H04M 3/493* | (2006.01) | |
| *H04L 67/51* | (2022.01) | |
| *H04L 67/52* | (2022.01) | |
| *H04W 8/08* | (2009.01) | |

(52) U.S. Cl.
CPC .... *H04M 2242/14* (2013.01); *H04M 2242/15* (2013.01); *H04M 2242/30* (2013.01); *H04W 8/08* (2013.01)

(56) References Cited

U.S. PATENT DOCUMENTS

| | | | |
|---|---|---|---|
| 9,699,609 B2* | 7/2017 | Dupray | H04M 3/4228 |
| 10,455,356 B2* | 10/2019 | Dupray | H04M 3/493 |

\* cited by examiner

NETWORK SERVICES DEPENDENT ON GEOGRAPHICAL CONSTRAINTS

CROSS REFERENCE TO RELATED APPLICATIONS

The present application is continuation of U.S. patent Ser. No. 15/622,856, filed Jun. 14, 2017 (now U.S. Pat. No. 10,455,356), which is a continuation of U.S. patent Ser. No. 14/791,387, filed Jul. 3, 2015, (now U.S. Pat. No. 9,699,609), which is a continuation of U.S. patent Ser. No. 14/228,951, filed Mar. 28, 2014, which is a continuation of U.S. patent Ser. No. 13/561,846, filed Jul. 30, 2012 (now U.S. Pat. No. 8,694,025), which is a continuation of U.S. patent application Ser. No. 10/857,565, filed May 28, 2004. All of the above references are incorporated herein by this reference.

RELATED FIELD OF THE INVENTION

The present invention relates to verifying geographic locations of users on a communications network, e.g., for determining whether to provide a product or service to such users, and in particular, the present invention is useful for determining whether a product or service can be legitimately provided to an Internet user by determining the Internet user's geographic location when the product or service is requested.

BACKGROUND

Geographically extensive communication networks such as the Internet are substantially viewed as being geographicless in the sense that such networks extend across substantially all national and all local country, state, and political boundaries. Accordingly, it has been difficult to monitor and/or provide certain services on networks, such as the Internet, due to the network not having sufficient capability for respecting such boundaries. Moreover, while legal statutes nay cause certain network sites to be restricted in their network services due to the site's geographical location being within the jurisdiction for such statutes, other network sites outside of the area to which the statutes apply may have an unfair advantage in that the prohibited services can be offered to substantially all network users from such latter network sites, In particular, the above described general scenario applies to gambling on the Internet in that, e.g., Internet sites within the United States are prohibited, in general, from offering wagering on games such as blackjack, poker, pai gow, craps and roulette due to gambling restrictions in various U.S. states and/or counties or other legal jurisdictions.

Additionally, other communication network services are also either not available or not appropriately restricted due to the lack of being able to locate and/or verify the locations of network users. In particular, certain software products have been determined by various governments to be restricted in their dissemination across national boundaries. Accordingly, if network users could have their locations verified, then such restrictions in the downloading of software from the Internet could be better enforced. Additionally, by verifying a location of a network user, network services could be effectively taxed according to the user's location when purchasing a network service such as the downloading of software via the Internet.

Moreover, by verifying a network user's location, a network site in communication with the user may be able to adapt its services and/or display to present to the user relevant information and services related to a geographical area within which the user is determined to be located. For example, an Internet website can utilize a verification of a user's location for selecting or prioritizing: (a) a list of additional website offering services that are available near the user's location, and/or (b) advertising of services or products locally available to the user. Note that the verification (or more precise determination) of a user's location in the present context may be particularly important for wireless Internet. users who are traveling and/or who do not know their current location, For example, providing such an Internet website for the travel industry, allows a user to access the website from different locations (via, e.g., different hotel Internet connections, or via a mobile wireless Internet connection), and subsequently select locally related advertising and other local information such as locally preferred restaurants, locations of scenic sites, a listing of local events, etc. based on the user's location and optionally the date and time (as contemplated by the present invention).

Accordingly, it would be desirable to have a network based capability for geographically verifying and/or more precisely determining the location o network users for allowing, restricting, and/or selecting network services according to each user's location.

SUMMARY

The present invention is a method and system for determining or verifying the geographic location of a user while the user is communicating on a communications network such as the Internet. The user's location can be straightforwardly determined by a provider of a product or service requested by the user during network communications between the user and the provider. Thus, the user's location can be determined at the time the service or product is requested by the provider.

In one embodiment of the present invention, to determine the location of the user's network station (and thus locating the user), the provider: (a) receives the user's phone number (or other identification for contacting the user's station), and (b) supplies the user's station with a distinctive identifier. Additionally, the provider supplies a location determining service with the user's phone number (or other identification) requesting that the location determining service determine tile location of the network station having the phone number. Moreover, a phone call is made to the phone number for retrieving the distinctive identifier from the network station having the phone number. If the distinctive identifier is retrieved and the location determining service indicates that the user's station is within an appropriate geographical area (or not within an inappropriate area), then the provider can provide the requested product or service to the user.

Thus the present invention is a location determining service for verifying, or more precisely determining, the location of users on a communications network such as the Internet. In particular, embodiments of the network based location system of the present invention combine network (e.g. Internet) services with telephony location services that are available for locating telephone users. In particular, such user location capabilities are widely used for emergency services such as 911. Moreover, enhancements in location technologies have extended the traditional landline based location services to also include users on wireless devices such as cellular or wireless telephones.

Thus, it is an aspect of the present invention, as related to the Internet, to combine: (a) Internet communications between, e.g., a website and a user with (b) additional telephony based communications between the website and the user for verifying the location of the user prior to providing and/or selecting the services that the website offers to the Internet user. In particular, the present invention transmits a unique identifier to an Internet user whose location is to be verified, and subsequently causes the Internet user to place a conventional telephony call to a predetermined phone number for transmitting the identification (provided in the initial Internet transmission to the Internet user). Subsequently, upon picking up the call placed by the Internet user to the predetermined number, the callee (e.g., the website) captures both the Internet user's telephone number and the transmitted identification. The transmitted identification is used to retrieve previously stored information about the Internet user, and in particular, a user's previously input general geographical location (e.g., the country, state or city within which the user has indicated he/she is located), and associate the user information with the Internet user's captured phone number.

Subsequently, the user's general location is used to identify a telephony location providing service having coverage for the user specified general geographical area of the Internet user for thereby determining or verifying a relatively precise location of the user, and providing this information to the website so that appropriate services can be selected for providing to the Internet user.

In one embodiment of the present application, the following steps are performed for determining the location of a user requesting services from a network site of a communications network:

Step 1: receiving, at the network site, user information for identifying the user, and a first approximate location of the user;

Step 2: determining, using the first approximate location of the user, a location service provider providing coverage for the first approximate user location;

Step 3: causing the user's network station to call a predetermined telephone number for identifying the user;

Step 4: receiving the user's call at the predetermined telephone number, and: (a) capturing the user's telephone number, and (b) obtaining identification information for identifying the user;

Step 5: transmitting the user's telephone number to one of the telephony location service providers selected for determining a location of the user; and Step 6: receiving from the selected telephony location service provider, a more precise location of the user; and determining services to be provided to the user on the communications network according to the more precise location.

Other features and benefits of the present invention will become evident from the accompanying drawings and the detailed description herein below.

DETAILED DESCRIPTION

Figure 1:
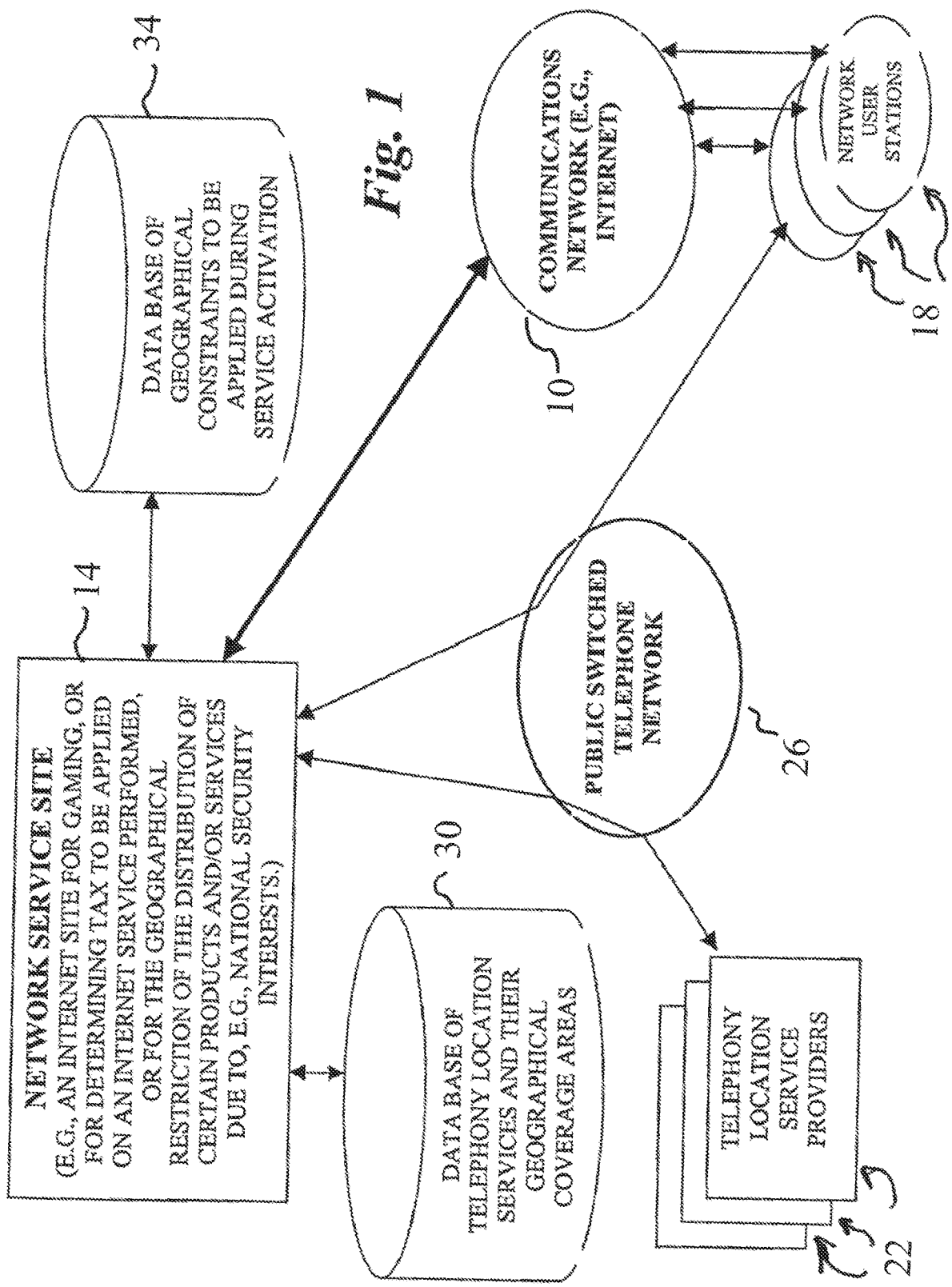
FIG. 1 is a block diagram showing the high level components used in an embodiment of the present invention wherein the communications network is, for example, the Internet.

FIG. 1 shows a high level diagram of the components used in an embodiment of the present invention. Accordingly, a communications network 10, such as the Internet, is used for providing network based services between a network service site 14 and one or more network user stations 18 whose locations are desired to be verified (or determined) one or more times by the network service site 14. Additionally, one or more telephony location service providers 22 are in communication with the network site 14, via one or more public switched telephone networks 26, wherein the network service site 14 provides the telephone numbers of users (at their stations 18) who are to have their locations determined. Accordingly, the telephony location service providers 22 respond with locations of the network users. Note that such telephony location service providers 22 are currently available for providing the location of telephony subscribers for emergency services such as 911. Moreover, various technologies have been developed for also verifying the location of users on cellular or wireless phones such as global positioning location technologies, time difference of arrival triangulation technologies, angle of arrival technologies, and multipath pattern matching technologies for wireless signals as one skilled in the art will understand. Moreover, as one skilled in the art will also understand, the automatic location identification (ALI) currently used for emergency 911 services can also be used for providing location services to other location requesters such as the network service site 14.

Figure 2A:
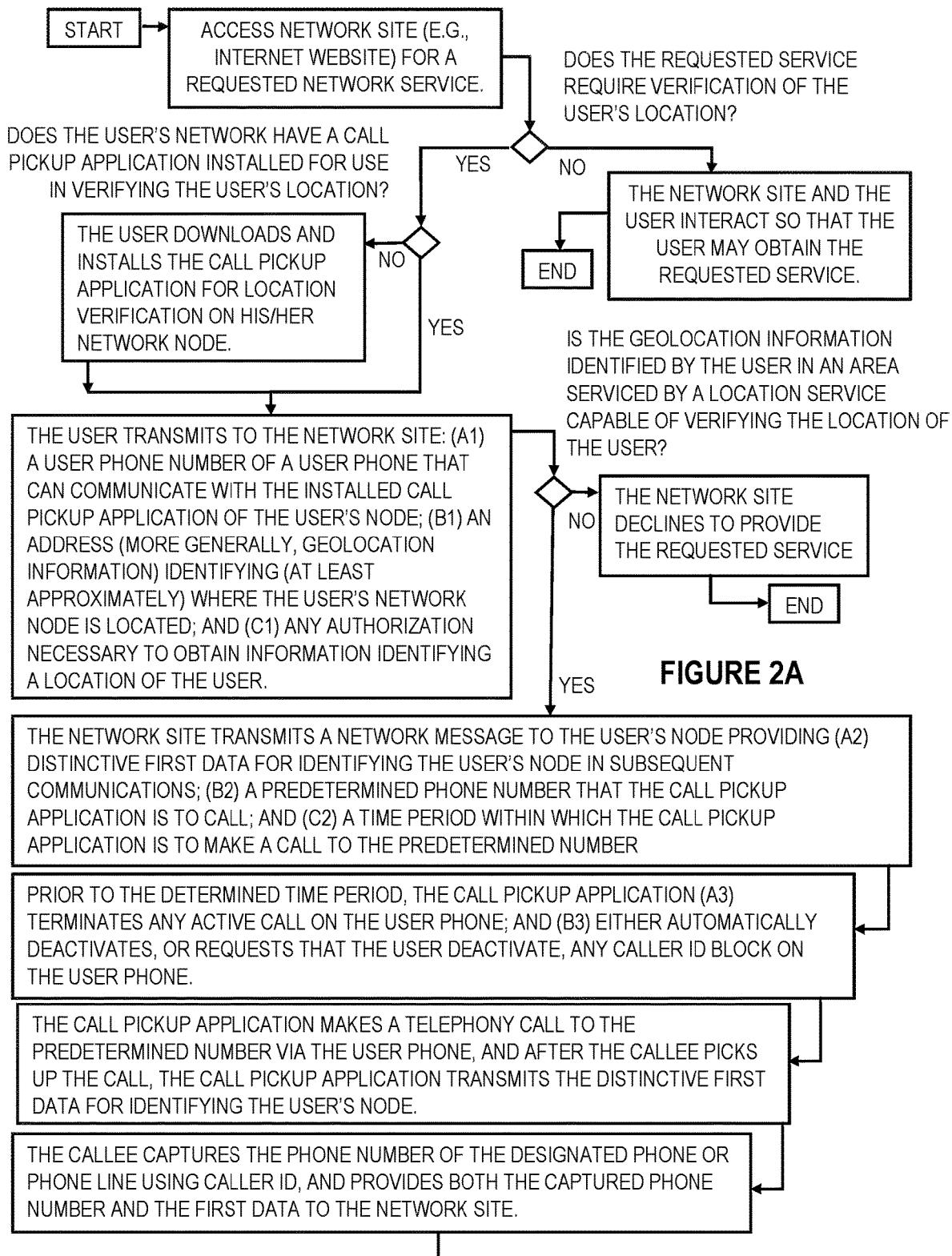
FIGS. 2A and 2B provide a flowchart of the high level steps performed at a network service site (e.g., an Internet website), and at a user's network station for verifying the location of the user.
Figure 2B:
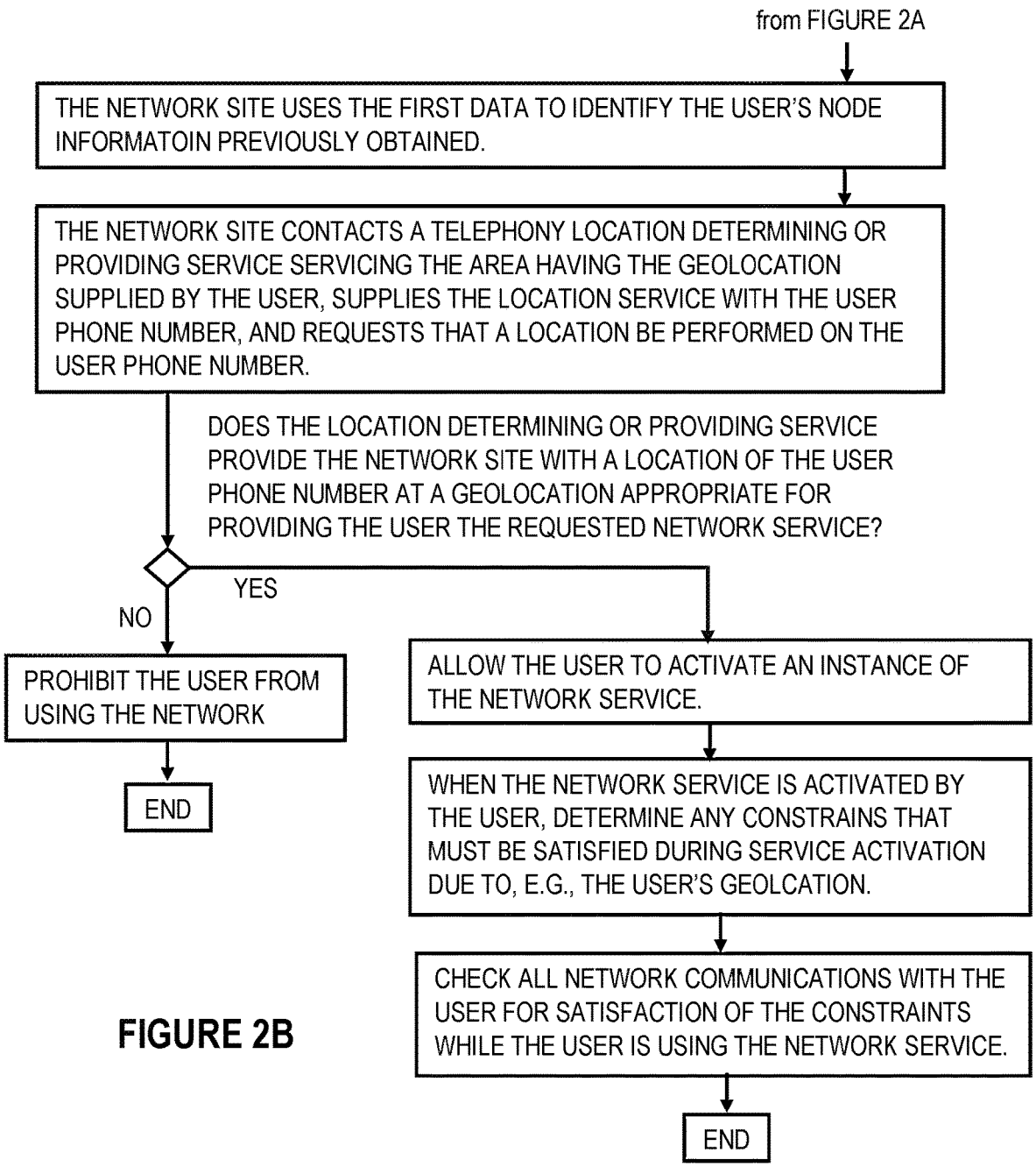

The network service site 14 also accesses a database 30 of telephony location service providers 22, wherein the database associates each location service provider with their corresponding geographical coverage area for providing locations of users. This database is used to select an appropriate location service provider 22 given the general area in which the network user has indicated he/she is located, Additionally, the network service site 14 also accesses a database 34 having any geographical constraints to be applied during service activation with a user once the user's location has been verified (e.g., gambling wagering limitations according to the user's location). Moreover, note that in addition to geographical constraints, the database 34 may also include geographically associated advertising and additional information to provide to the user depending upon the user's verified location, A general high level flowchart illustrating the steps performed by the present invention is provided in the flowchart of FIGS. 2A and 2B. Note that this flowchart describes the steps performed when a network user request a particular service. However, as one skilled in the art will understand, a similar flowchart can be provided for substantially unrequested services as advertising of locally available products and/or services, The foregoing discussion of the invention has been presented for purposes of illustration and description. Further, the description is not intended to limit the invention to the form disclosed herein. Consequently, variations and modifications commensurate with the above teachings, and within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention, It is intended that the appended claims be construed to include alternative embodiments to the extent permitted by the prior art.

What is claimed is:

1. A method for providing a service or product dependent on a location of a user or a mobile wireless communication station, the communication station for providing wireless communications, wherein one or more communication networks are accessed wirelessly by the communication station from a plurality of different locations, comprising performing by computational equipment the following (a) through (d):
   (a) receiving, via one of the communication networks, communication from the communication station, identification information that identifies the user or the communication station;
   (b) determining a location provider or determiner for locating the communication station, wherein the location provider or determiner is determined according to a geographic area containing a first approximate location for the communication station;
   (c) receiving, in response to a request for a location of the communication station and dependent on the identification information, a more precise location of the communication station, wherein the location provider or determiner, activated according to the first approximate location, obtains the more precise location, the more precise location dependent one of: a global positioning location technology, a wireless signal time difference of arrival location technology, a wireless signal angle of arrival location technology, and a wireless signal pattern matching location technology; and
   (d) providing one or more services to the user dependent on the more precise location, wherein a database having one or more geographic constraints is accessed for applying the constraints to the more precise location.

2. The method of claim 1, wherein the location provider or determiner is activated using the first approximate location for the communication station.

3. The method of claim 1, further comprising:
   transmitting, based on the more precise location, content to the communication station.

4. The method of claim 3, wherein the content includes advertising based on the more precise location.

5. The method of claim 3, wherein the content includes a listing of one or more items geographically located near the more precise location.

6. The method of claim 3, wherein the content is restricted to only being transmitted to a geographic service area that includes the more precise location.

7. The method of claim 1, wherein the services include selecting or prioritizing network sites based on the more precise location, wherein the selecting or prioritizing includes obtaining advertising information for identifying products or services that are available near to the more precise location.

8. The method of claim 1, further comprising:
   transmitting to the communication station the identification information.

9. The method of claim 1, wherein the first approximate location for the communication station is used for selecting the location provider or determiner for determining the more precise location.

10. The method of claim 1, further including identifying the location provider or determiner from a plurality of location providers or determiners for determining the more precise location.

11. The method of claim 1, wherein the method is performed at a time a product or service is requested via an Internet transmission by the user.

12. A method for providing a service or product dependent on a location of a mobile wireless communication station, the communication station for providing wireless network communications, wherein one or more communication networks are accessed wirelessly by the communication station from a plurality of different locations, comprising performing by computational equipment the following (a) through (e):
   (a) receiving, via one communication network of the communication networks, identification information for identifying the communication station or a user therefor;
   (b) requesting, based on the identification information, a location of the communication station;
   (c) determining a location provider or determiner for locating the communication station, wherein the location provider or determiner is determined according to a geographic area containing a first approximate location for the communication station;
   (d) receiving, in response to the requesting, a more precise location of the communication station than a wireless coverage for the communication station, wherein the location provider or determiner, activated according to the first approximate location for the communication station, obtains the more precise location, the more precise location dependent one of: a wireless signal time difference of arrival location technology, a wireless signal angle of arrival location technology, and a wireless signal pattern matching location technology;
   wherein the communication station includes a wireless device for communicating on the Internet during a performance of (a) through (d); and
   (e) providing one or more services to the user dependent on the more precise location, wherein a database having one or more geographic constraints is accessed for applying the constraints to the more precise location.

13. The method as claimed in claim 12, wherein the one or more services are directed to one or more of: services for games, taxation services, services for a distribution of software, advertising presentations, and information related to locations within a local geographical area, and wherein the user is expected to find information of interest.

14. The method of claim 12, wherein the location provider or determiner is selected using the first approximate location for the communication station.

15. The method of claim 12, wherein the location provider or determiner is selected according to a wireless coverage area for the location provider or determiner.

16. The method of claim 12, further comprising:
    transmitting, based on the more precise location, content to the communication station.

17. The method of claim 12, further comprising:
    transmitting to the communication station the identification information;
    wherein the identification information is stored on the communication station for use in a subsequent communication on the one communication network.

18. The method of claim 12, wherein a first approximate location is used for selecting the location provider or determiner for obtaining the more precise location.

19. The method of claim 12, further including identifying the location provider or determiner from a plurality of location providers or determiners for determining the more precise location.

20. The method of claim 16, wherein the content includes local information to the more precise location, the local information including at least one of: locally related advertising, a locally preferred establishment, a local point of interest, and a local event.

21. A method for providing service or product dependent on a location of a mobile wireless communication station for providing wireless communications therewith, wherein one or more communication networks are accessed wirelessly by the communication station from a plurality of different locations, comprising performing by electronic equipment the following (a) through (e);
  wherein information is transmitted, via a network communication, to the communication station for storing thereon and distinctively identifying the communication station or a user therefor;
  (a) receiving, from the communication station via a network communication, the information;
  (b) requesting, based on the information, a location of the communication station when the communication station or the user therefor is identified;
  (c) determining a location provider or determiner for locating the communication station, wherein the location provider or determiner is determined according to a geographic area containing a first approximate location for the communication station;
  (d) receiving, in response to the requesting, a more precise location of the communication station, wherein the location provider or determiner, activated dependent upon the first approximate location, obtains the more precise location; and
  (e) providing one or more services to the user dependent on the more precise location, wherein a database having one or more geographic constraints is accessed for applying the constraints to the more precise location.

22. The method of claim 21, wherein the location provider or determiner determines the more precise location dependent one of: a global positioning location technology, a wireless signal time difference of arrival location technology, a wireless signal angle of arrival location technology, and a wireless signal pattern matching location technology.

23. The method of claim 21, wherein the location provider or determiner is activated using the first approximate location for the communication station.

24. The method of claim 21, further comprising:
  transmitting, based on the more precise location, content to the communication station.

25. The method of claim 24, wherein the content includes advertising based on the more precise location.

26. The method of claim 24, wherein the content includes a listing of one or more items geographically located near the more precise location.

27. The method of claim 21, further comprising:
  transmitting to the communication station the information.

28. The method of claim 24, wherein the services include selecting or prioritizing network sites based on the more precise location, wherein the selecting or prioritizing includes obtaining advertising information for identifying products or services that are available near to the more precise location.

29. The method of claim 24, wherein the content is restricted to only being transmitted to a geographic service area that includes the more precise location.

30. The method of claim 21, wherein the first approximate location for the communication station is used for selecting the location provider or determiner for determining the more precise location.

31. The method of claim 21, further including identifying the location provider or determiner from a plurality of location providers or determiners for determining the more precise location.

32. The method of claim 21, wherein the method is performed at a time a product or service is requested via an Internet transmission by the user.

33. The method of claim 21, wherein the location provider or determiner is selected according to a wireless coverage area for the location provider or determiner.

34. The method of claim 21, further including determining the one or more services according to the more precise location.

35. The method of claim 34, wherein at least one of the services is presented to the user via an Internet website, wherein the Internet website includes local information to the more precise location, the local information including at least one of: locally related advertising, locally preferred establishment, local point of interest, and local event.

36. The method of claim 1, wherein the applying includes verifying the more precise location.

37. The method of claim 1, the applying is for activation of the one or more services.

38. The method of claim 12, wherein the applying includes verifying the more precise location.

39. The method of claim 12, the applying is for activation of the one or more services.

40. The method of claim 21, wherein the applying includes verifying of the more precise location.

41. The method of claim 21, the applying is for activation of the one or more services.

42. The method of claim 1, wherein the one or more services provide access to the service or product.

43. The method of claim 12, wherein the one or more services provide access to the service or product.

44. The method of claim 21, wherein the one or more services provide access to the service or product.

* * * * *